United States Patent
Erlich

(10) Patent No.: US 9,918,452 B2
(45) Date of Patent: Mar. 20, 2018

(54) METHOD AND APPARATUS FOR CONTROLLING HERBIVORE FOWL POPULATIONS

(71) Applicant: 2345422 Ontario Inc., Toronto (CA)

(72) Inventor: Dan Erlich, Toronto (CA)

(73) Assignee: 2345422 Ontario Inc., Toronto, Ontario (CA)

( * ) Notice: Subject to any disclaimer, the term of this patent is extended or adjusted under 35 U.S.C. 154(b) by 0 days.

(21) Appl. No.: 15/603,003

(22) Filed: May 23, 2017

(65) Prior Publication Data

US 2017/0258038 A1  Sep. 14, 2017

Related U.S. Application Data

(62) Division of application No. 14/057,460, filed on Oct. 18, 2013, now abandoned.

(30) Foreign Application Priority Data

Sep. 10, 2013  (CA) ..................... 2826456

(51) Int. Cl.
*A01M 29/00* (2011.01)
*A01K 5/02* (2006.01)
(Continued)

(52) U.S. Cl.
CPC ............ *A01K 5/0291* (2013.01); *A01K 15/02* (2013.01); *A01K 39/00* (2013.01); *A01K 39/01* (2013.01);
(Continued)

(58) Field of Classification Search
CPC ....... A01K 39/00; A01K 39/01; A01M 29/00; A01M 29/02
(Continued)

(56) References Cited

U.S. PATENT DOCUMENTS 2,967,128 A  1/1961  Kare
4,790,990 A  12/1988  Mason et al.
(Continued)

OTHER PUBLICATIONS

"Bird Repellent"; Dec. 21, 2011 (capture from archive.org); <http://grapeseek.org/birdrepel.htm>.
(Continued)

*Primary Examiner* — Monica L Williams
*Assistant Examiner* — Michael A. Fabula
(74) *Attorney, Agent, or Firm* — The Webb Law Firm

(57) ABSTRACT

A method and apparatus is provided for controlling the location in which herbivore fowl populations congregate by altering the behavior of the fowl through the combination of providing a strong disincentive to populate areas where the presence of the fowl is not desired and a strong incentive to populate a proximate area where the presence of fowl can be tolerated. For herbivore waterfowl, and in particular Canada geese, the adjacent area also provides the waterfowl with a means of egress to water as an escape from predators and other perceived threats. The method uses a deterrent in the form of adulterated feed to dissuade the herbivore fowl from congregating in areas in which their presence is not desired and the use of an attractant in the form of non-adulterated feed to encourage the herbivore fowl to congregate in a proximate area in which their presence can be tolerated.

11 Claims, 6 Drawing Sheets

(51) Int. Cl.
*A01M 31/00* (2006.01)
*A01M 29/12* (2011.01)
*A01K 39/012* (2006.01)
*A01K 15/02* (2006.01)
*A01K 39/00* (2006.01)
*A01K 39/01* (2006.01)

(52) U.S. Cl.
CPC ........... *A01K 39/012* (2013.01); *A01M 29/00* (2013.01); *A01M 29/12* (2013.01); *A01M 31/008* (2013.01)

(58) Field of Classification Search
USPC ........................................................ 119/713
See application file for complete search history.

(56) References Cited

U.S. PATENT DOCUMENTS

| | | | | |
|---|---|---|---|---|
| 4,847,292 | A * | 7/1989 | Katz | A01N 27/00 514/526 |
| 4,853,413 | A | 8/1989 | Katz et al. | |
| 5,187,196 | A | 2/1993 | Cummings et al. | |
| 5,296,226 | A | 3/1994 | Askham | |
| 5,464,625 | A | 11/1995 | Nolte et al. | |
| 5,466,674 | A | 11/1995 | Preiser et al. | |
| 5,672,352 | A | 9/1997 | Clark et al. | |
| 5,700,474 | A * | 12/1997 | Preiser | A01N 25/02 424/405 |
| 5,849,320 | A | 12/1998 | Turnblad et al. | |
| 5,876,739 | A | 3/1999 | Turnblad et al. | |
| 9,439,395 | B2 * | 9/2016 | Bachman | A01K 5/00 |
| 2002/0177526 | A1 | 11/2002 | Chen et al. | |
| 2004/0035879 | A1 * | 2/2004 | Vergote | A01M 29/12 222/3 |
| 2004/0037863 | A1 * | 2/2004 | Crawford | B05B 7/0012 424/405 |
| 2006/0016905 | A1 * | 1/2006 | Roreger | A01M 1/2055 239/34 |
| 2006/0189690 | A1 | 8/2006 | Dunham et al. | |
| 2006/0251691 | A1 | 11/2006 | Crawford | |
| 2007/0141098 | A1 | 6/2007 | Crawford | |
| 2007/0152078 | A1 | 7/2007 | Crawford | |
| 2008/0299144 | A1 | 12/2008 | Rolston et al. | |
| 2009/0027995 | A1 * | 1/2009 | Bachman | A01K 5/001 366/132 |
| 2009/0092646 | A1 * | 4/2009 | Dunham | A01M 29/06 424/405 |
| 2009/0261180 | A1 | 10/2009 | Donoho et al. | |
| 2009/0288606 | A1 * | 11/2009 | Zimmerman | A01K 5/02 119/51.02 |
| 2010/0096471 | A1 | 4/2010 | Djordjic | |
| 2010/0239708 | A1 * | 9/2010 | Bachman | A01K 5/00 426/2 |
| 2012/0165190 | A1 | 6/2012 | Dunham et al. | |
| 2015/0068100 | A1 * | 3/2015 | Erlich | A01M 31/008 43/2 |

OTHER PUBLICATIONS

"Handbook, Canada and Cackling Geese: Management and Population Control in Southern Canada", Canadian Wildlife Service Environment Canada, 2010, twenty (20) pages, Cat. No. CW66-283/2010E-PDF.

Hilkevitch, John; "O'Hare enlists grape flavoring to repel birds"; Nov. 11, 2004; Chicago Tribune.

Holevinski et al., "Hazing of Canada geese is unlikely to reduce nuisance populations in urban and suburban communities", Human-Wildlife Conflicts, Fall 2007, p. 257-264, vol. 1, No. 2.

"Humane Goose-Control Solutions", PETA, 16 pages.

Hurburgh et al.; "Flooding and Stored Grain"; Jun. 2011; Iowa State University.

Kim, Stefani; "Don't Drink the Grape Kool-Aid: More Solutions for Mamaroneck Geese"; Mar. 11, 2013; <http://patch.com/new-york/larchmont/don-t-drink-the-grape-kool-aid-more-solutions-for-mam22c33f6cc6>.

Smith et al., "Managing Canada Geese in Urban Environments", A Technical Guide, Publication of Cornell Cooperative Extension, The University of Wisconsin, 1999, pp. 1-43.

"Waterfowl Hunting and Baiting"; Oct. 9, 2004; U.S. Fish and Wildlife Service.

\* cited by examiner

METHOD AND APPARATUS FOR CONTROLLING HERBIVORE FOWL POPULATIONS

CROSS-REFERENCE TO RELATED APPLICATIONS

This application is a divisional of U.S. Ser. No. 14/057,460, filed on Oct. 18, 2013, and claims priority to Canadian Patent Application No. 2,826,456, filed on Sep. 10, 2013, the disclosures of which are hereby incorporated in their entirety by reference.

FIELD OF THE INVENTION

The present invention relates to an improved method and apparatus for controlling the manner in which nuisance herbivore fowl populations, and in particular Canada geese populations, congregate by altering the behaviour of the fowl through the combination of providing a disincentive to congregate in areas where their presence is not desired, and an incentive to congregate in one or more alternative areas where their presence can be tolerated.

BACKGROUND OF THE INVENTION

Certain species of birds are protected under the Migratory Bird Treaty Act of 1918, which in turn is Federal Law in Mexico, the United States of America and Canada. Historically, the species governed by these laws migrated along flight paths with a change in seasons. Several events have affected how man and these birds have interacted. For example, when DDT (dichlorodiphenyltrichloroethane) was banned in the 1970s, its negative effect to bird eggshells was eliminated and threatened bird populations were no longer facing decimation. Additionally, natural predation from animals such as foxes, coyotes and wolves has gradually reduced owing to population declines of these predators, in part due to human expansion on lands they previously habituated. The human expansion has also affected the availability of suitable habitats for birds resulting in the significant presence of birds in urban areas. Further, a general trend in warming temperatures has increased the access to winter food supplies, which has altered the migratory behaviour of many bird species.

The net effect of the protective laws remaining in force, coupled with the above changes in migration, the availability of habitats, and the decline in predators, has resulted in increases in the populations of certain species of birds, including herbivore fowl, and in particular, herbivore waterfowl. For many bird species, these changes have also resulted in an increase in conflicts between man and bird. For example, many species of birds, in particular herbivore fowl, are attracted to areas of shortly mowed grass that allows the fowl to feed on the turf. More particularly, herbivore waterfowl are attracted to areas of shortly mowed grass that are adjacent to, and/or have easy access to, bodies of water, such as ponds and lakes, that provide both a plentiful source of food (the grassy area) and ready means of escape from predators (the body of water). This is particularly the case during seasons where the fowl are molting and have lost their flight feathers and/or are raising newly hatched young that are not yet capable of flight. In either circumstance, the waterfowl are prevented from taking to the air in order to escape predators and rely upon water as a safe refuge from ground-based predators for themselves and their families.

With the gradual increase in herbivore fowl populations, and in particular herbivore waterfowl populations such as Canada geese, there have been increased incidences of negative interaction between some of these species and man, in particular on crops, parklands, golf courses and with aircraft. These interactions range in severity from being a nuisance to being extremely costly, or even deadly in the case of fowl congregating in aircraft flight paths. At the same time, government programs for population control of bird species have been reduced. Many government departments of natural resources in the past had budgets in place for egg addling, however, many of these have been eliminated or reduced in recent years allowing for less restriction in the growth of the bird populations.

Current methods used for controlling bird populations are directed to both lethal and non-lethal forms of control, and in particular to the use of non-lethal harassment. These methods have been summarized in numerous resources. For example, the Canadian Wildlife Service of Environment Canada has prepared a 2010 handbook for the management and population control of Canada and Cackling Geese (see Handbook, Canada and Cackling Geese: Management and Population Control in Southern Canada"; Canadian Wildlife Service, Environment Canada; Cat. no.: CW66-283/2010E-PDF). The report notes that once geese become established in an area, it can be difficult to make them leave, but that their numbers can be controlled by both non-lethal and lethal management techniques. Non-lethal management techniques that do not require permits include: stopping supplemental feeding, landscape modification, barriers, modification of lawn grass (through grass length, grass type and the use of repellents), scaring/hazing (for example, propane cannons, horns and sirens; lights and lasers; distress tapes; flagging tape and streamers; balloons and kites; scarecrows; motion-activated streamers; and dogs). Non-lethal scare techniques requiring a permit include the use of a firearm (including cracker shells, screamers and bangers), aircraft and raptors. The removal/relocation of geese also requires a permit. Lethal management techniques include hunting, egg sterilization/destruction, and lethal removal. The report also notes that providing alternative feeding areas with plants that geese prefer to eat will enhance the effectiveness of most hazing and habitat manipulation techniques.

In addition to terrorizing the geese, these deterrent methods can often annoy humans (particularly noise and light-related harassment techniques) and often require the modification of landscapes in undesirable ways by saturating grassy areas with chemical repellents, allowing grass to grow to longer lengths, erecting barriers that impede human traffic as well as waterfowl traffic, and the display of visual deterrents that can be unsightly in a natural environment. While the provision of alternative feeding areas is stated to enhance the effectiveness of most hazing techniques, providing a suitable area is often impractical in practice. In addition to requiring a large area of space that is desirable for human use, in order to be effective this technique requires both the extreme application of harassment/hazing techniques in the area in which geese are not desired to make the area as unattractive as possible, and extreme efforts to make the alternative feeding area sufficiently attractive to the geese. However, the efforts to deter and attract geese will work equally well on humans, who will suffer the effects of the harassment techniques and also be drawn to the alternative feeding areas which provide large, well-kept lawns and open access to water.

With respect to the use of chemical repellents aimed at making grass or other vegetation unpalatable, the most commonly used repellents are comprised of methyl anthranilate (for example, sold as REJEX-IT®), a substance that is naturally occurring in grapes and used as a food additive for humans, but which renders the grass unpalatably bitter to fowl. A second type of repellent that is available is anthraquinone-based (for example, sold as GOOSECHASE®), which is also safe for humans but is unpalatable and causes a feeling of digestive irritation for geese. However, the application of repellents over large grassy areas is costly and requires re-application after rains or irrigation, as well as after the grass is mowed, in order to maintain effectiveness. Moreover, the widespread spraying of chemicals is not desirable in recreational areas. Thus, for areas with maintained lawns, such as parks, lawns and golf courses, the use of repellents is generally costly and ineffective as a long-term solution for the control of nuisance herbivore fowl populations, and in particular herbivore waterfowl populations such as Canada geese.

Ultimately, methods involving harassment prove to be ineffective in the long term for one primary reason—the bird's need to survive trumps mankind's desire and his allowable resources to eliminate them. The herbivore fowl, and in particular herbivore waterfowl such as Canada geese, are eventually harassed to the point where there are no acceptable feeding areas available in a given location or they become aware that the harassment techniques, while annoying, do not involve real danger. In either event, the herbivore fowl will soon return to areas in which their presence is not desired.

Owing to the lack of long-term effect, and despite the knowledge and availability of various methods of controlling the location in which nuisance herbivore fowl populations congregate, including the use of repellents, the use of alternative feeding areas, and their combination, there remains significant problems in the effective application of these methods. As a result, there is a need for an improved method and means of implementing said method, to control the manner in which herbivore fowl populations congregate that dissuades the fowl from congregating in areas where their presence is not desired and encourages the fowl to congregate in alternative areas in which their presence can be tolerated.

SUMMARY OF THE INVENTION

The present method and associated apparatus provides a solution to the ongoing problem experienced by residential, recreational, commercial and municipal landowners in which nuisance herbivore fowl populations, and in particular herbivore waterfowl populations such as Canada geese, congregate in locations, for example in municipal or private parklands, lawns and golf courses, where they are not desired. For herbivore waterfowl populations, this includes municipal or private parklands, lawns and golf courses in areas adjacent to ponds and lakes.

Accordingly, in one aspect of the present invention there is provided a method for controlling the location in which herbivore fowl populations congregate while on land, the method comprising:
 (a) providing a deterrent in the form of adulterated feed in the area in which the presence of herbivore fowl is not desired; and
 (b) providing an attractant in the form of non-adulterated feed in an alternative area where the presence of the herbivore fowl can be tolerated that is proximate to the area in which the presence of fowl is not desired.

In a preferred embodiment where the herbivore fowl is a species of herbivore waterfowl, and in particular, Canada geese, the alternative area in which the herbivore waterfowl population can be tolerated provides a means of egress for the waterfowl to open water to escape predators and other perceived threats.

With this and subsequent embodiments, it is preferred that the adulterated feed is feed that has been treated with an avian repellent such that the repellent is absorbed by or adheres to the feed.

Optionally, the alternative area in which the herbivore fowl population can be tolerated is, absent the provision of the non-adulterated feed, not an area in which the herbivore fowl can obtain an adequate supply of food. This includes areas that are substantially grass-free, man-made structures, and areas that are primarily covered in dirt, rock, stone, sand, asphalt or other man-made surfaces. The main requirement regarding the terrain in the area is that the fowl can physically navigate the area and are willing to do so.

In an alternative aspect of the present invention, the deterrent is distributed in the area in which the herbivore fowl population is not desired by one or more repellent stations, wherein the repellent station comprises:
 (a) a hopper capable of storing adulterated feed; and
 (b) a means for controlling the distribution of the adulterated feed at scheduled intervals; and, optionally
wherein the attractant is distributed in the alternative area in which the herbivore fowl population can be tolerated by one or more attractant stations, wherein the attractant station comprises:
 (a) a hopper capable of storing the non-adulterated feed; and
 (b) a means for controlling the distribution of the non-adulterated feed at scheduled intervals.

Optionally, the repellent station is comprised of:
 (a) a hopper capable of storing feed, wherein the feed is not adulterated;
 (b) a means for controlling the distribution of the feed at scheduled intervals;
 (c) a repellent reservoir capable of storing a repellent solution; and
 (d) a means for controlling the release of the repellent solution such that the repellent solution is released concurrently with the distribution of the feed, or immediately thereafter, in such a manner that the repellent solution adulterates the feed to form the adulterated feed.

Optionally, the feed in the repellent station is adulterated with the repellent solution as the feed is distributed from the hopper.

In another aspect of the present invention, there is provided a repellent station for use with the above methods, the repellent station comprising:
 (a) a hopper capable of storing non-adulterated feed;
 (b) a means for controlling the distribution of the non-adulterated feed at scheduled intervals;
 (c) a repellent reservoir capable of storing a repellent solution; and
 (d) a means for controlling the release of the repellent solution such that the repellent solution is released concurrently with the distribution of the feed, or immediately thereafter, in such a manner that the repellent solution adulterates the feed to form the adulterated feed.

Optionally, the repellent solution is sprayed on the non-adulterated feed as the non-adulterated feed is distributed from the hopper, and the repellent station may also include a means of controlling the amount of repellent solution that is released.

Alternatively, the repellent reservoir need not be part of the hopper itself, and can be present as part of a separate repellent dispenser. In this embodiment, there is provided a repellent station for use with the above methods, the repellent station comprising:

(a) a hopper capable of storing non-adulterated feed;
(b) a means for controlling the distribution of the non-adulterated feed at scheduled intervals; and
(c) a repellent dispenser, wherein the repellent dispenser is comprised of:
  (i) a repellent reservoir capable of storing a repellent solution; and
  (ii) a means for controlling the release of the repellent solution such that the repellent solution is released concurrently with the distribution of the non-adulterated feed, or immediately thereafter, in such a manner that the repellent solution adulterates the feed to form the adulterated feed.

Optionally, the repellent dispenser sprays the repellent solution on the non-adulterated feed as the non-adulterated feed is distributed from the hopper, and may also include a means of controlling the amount of repellent solution that is released.

BRIEF DESCRIPTION OF THE DRAWINGS

Embodiments of the present invention are described, by way of example only, with reference to the attached Figures.

DETAILED DESCRIPTION OF THE INVENTION

Figure 1A:
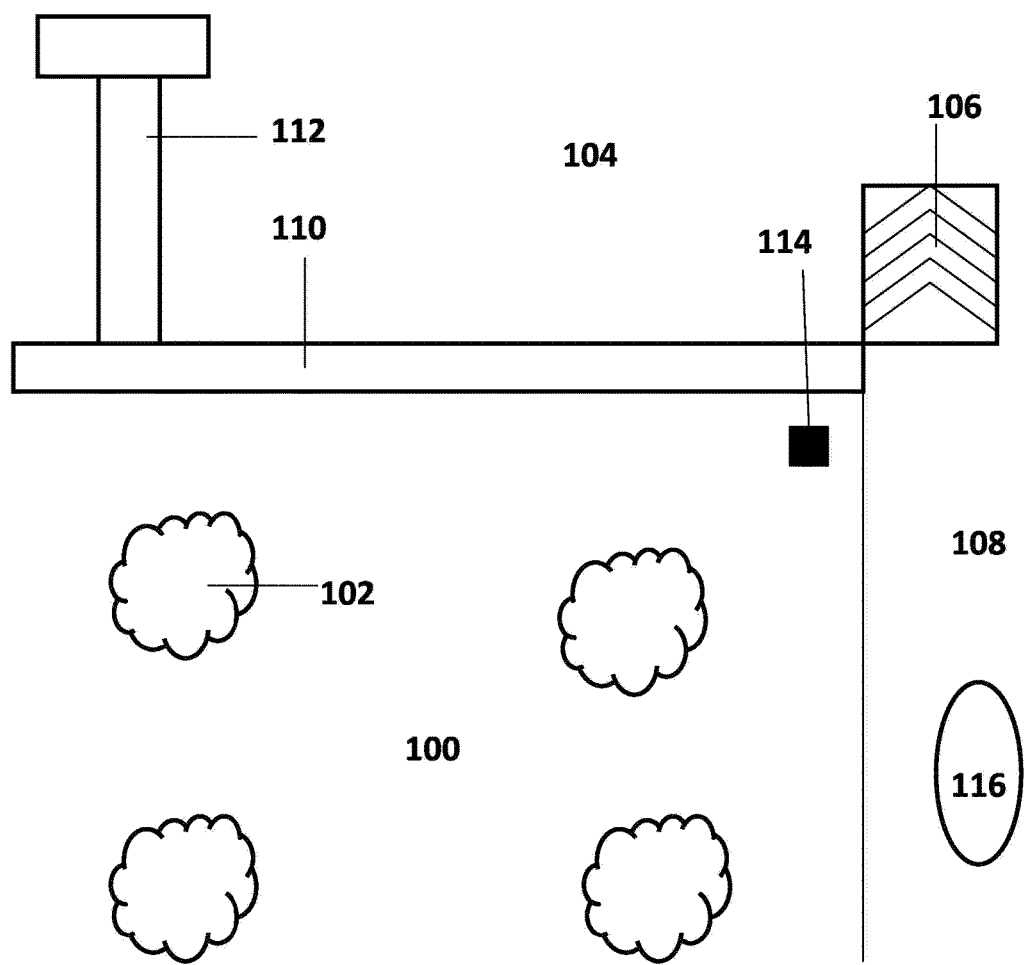
FIGS. 1a and 1b provide a depiction of one embodiment of the present invention in a park area as explained in Example 2.

The problems associated with controlling nuisance herbivore fowl populations, and in particular herbivore waterfowl populations such as Canada geese, from congregating in areas in which their presence is not desired is well-known. Traditional methods of controlling herbivore fowl populations are also well-known; however, these methods are generally viewed to be ineffective in providing a long-term solution to population control. The new method of the present invention for controlling herbivore fowl populations, and in particular, herbivore waterfowl populations such as Canada geese populations, provides an effective and functional improvement over known methods. The new method is more effective over the long term, more cost-effective, requires less manpower to implement, and is less intrusive on human populations who desire to use the areas from which the fowl are being deterred. By reducing the level of harassment inflicted on the fowl to deter their presence in areas where their presence is not desired, while at the same time providing a strong incentive to relocate in the form of a more desirable source of food, it has been found that the traditional behaviour of the fowl can be modified in such a manner that they are content to congregate in areas that they would not typically favour.

The new method of the present invention of controlling herbivore fowl populations involves both the use of a repellent, in the form of adulterated feed, to deter the fowl from congregating to feed in areas where their presence is not desired, and the use of an attractant, in the form of non-adulterated feed, to lure the fowl to an alternative congregating/feeding area where the fowl population can be tolerated. Importantly, the attractant feed is a more desirable food source than found in the area where the herbivore fowl would normally congregate to feed. For example, many types of herbivore fowl, including herbivore waterfowl such as Canada geese and other geese species, will tend to congregate and feed in open grassy areas adjacent to open bodies of water. Through this approach, the herbivore fowl are provided with an abundant and preferable food supply, and are deterred from congregating from the area in which their presence had become a nuisance without the need for wide-spread and expensive spraying with a repellent, the need to rely on unsightly visual deterrents (for example, lights/lasers, flagging tape, streamers, balloons, and scarecrows), or the need to rely on landscape modification. In the case of herbivore waterfowl, this landscape modification includes limiting the access of the fowl to water, which in turn also makes it less convenient for human access to the water. With the present method, it is also unnecessary to rely upon more disruptive hazing methods such as propane canons, horns, sirens, distress tapes or dogs, which can be an audible annoyance to humans and, in the case of dogs, deadly for the fowl, particularly if they are presently molting and are unable to escape by flight. Similarly, through the application of the present method, herbivore fowl populations can be relocated to areas where there presence will not be a nuisance without requiring the applicant of lethal management techniques in order to control fowl nuisance populations.

In its simplest embodiment, a first aspect of the present invention provides a method for controlling the location in which herbivore fowl populations congregate while on land, the method comprising:

(a) providing a deterrent in the form of adulterated feed in the area in which the presence of herbivore fowl is not desired; and
(b) providing an attractant in the form of non-adulterated feed in an alternative area where the presence of the herbivore fowl can be tolerated that is proximate to the area in which the presence of herbivore fowl is not desired.

In a preferred embodiment where the herbivore fowl is a species of herbivore waterfowl, and in particular, Canada geese, the alternative area in which the herbivore waterfowl population can be tolerated provides a means of egress for the waterfowl to open water to escape predators and other perceived threat.

In a more advanced embodiment, a second aspect of the present invention provides a method for controlling the location in which herbivore fowl populations congregate while on land, wherein the deterrent is provided by one or more repellent stations, wherein the repellent station comprises:

(a) a hopper capable of storing the adulterated feed; and (b) a means for controlling the distribution of the adulterated feed at scheduled intervals.

Similarly, the attractant can be provided by one or more attractant stations, wherein the attractant station comprises:
(a) a hopper capable of storing non-adulterated feed; and
(b) a means for controlling the distribution of the non-adulterated feed at scheduled intervals.

In a further embodiment, the repellent station will be comprised of:
(a) a hopper capable of storing feed, wherein the feed is not adulterated;
(b) a means for controlling the distribution of the non-adulterated feed at scheduled intervals;
(c) a repellent reservoir capable of storing a repellent solution; and
(d) a means for controlling the release of the repellent solution such that the repellent solution is released concurrently with the distribution of the non-adulterated feed, or immediately thereafter, in such a manner that the repellent solution adulterates the non-adulterated feed to form the adulterated feed.

In a preferred embodiment, the repellent solution is sprayed on the non-adulterated feed as the feed is distributed from the hopper.

In a further embodiment of the invention there is provided a repellent station comprising:
(a) a hopper capable of storing feed, wherein the feed is not adulterated;
(b) a means for controlling the distribution of the non-adulterated feed at scheduled intervals;
(c) a repellent reservoir capable of storing a repellent solution; and
(d) a means for controlling the release of the repellent solution such that the repellent solution is released concurrently with the distribution of the non-adulterated feed, or immediately thereafter, in such a manner that the repellent solution adulterates the non-adulterated feed to form the adulterated feed.

The method and repellent station of the present invention are illustrated in the following non-limiting descriptions.

The Alternative Area

The method of the present invention can be used to control the locations in which populations of herbivore fowl congregate at a wide of variety of sites, but most particularly in parklands, lawns and golf courses that are frequented by humans, and around airports where the intrusion of herbivore fowl into flight paths poses a significant safety risk to aircraft during take-off and landing. However, unlike known methods of controlling herbivore fowl populations, and in particular the known methods of controlling herbivore waterfowl populations such as Canada geese, that have continuously proven ineffective over the long-term, and which are designed to remove the fowl from the area entirely, the methods of the present invention are effective by inducing the fowl to move to a proximate location where their presence can be tolerated by humans. Notably, the proximate location can be an area that would, under normal circumstances, not be attractive to herbivore fowl since it does not provide a natural food supply, for example, the low-cut grassy areas that they often favour.

Although the use of alternate feeding sites itself is not new as they have been suggested in prior methods to control herbivore fowl populations, in order to be effective, these alternative feeding sites must be more attractive to the herbivore fowl than the area in which the fowl are not desired. For example, herbivore waterfowl generally congregate in large areas of short-cut grass that provide a desirable food supply and have open access to a source of water. These features also make the areas attractive to humans, which in turn perpetuates the initial problem of deterring the birds from congregating in which their presence is deemed to be intolerable to humans.

Unlike prior approaches to controlling herbivore fowl populations, the methods of the present invention allow for the use of alternative areas where the fowl would not normally congregate, and accordingly, the methods require less dedicated space than traditional methods. This can include areas that are covered or primarily covered with dirt, rock, stone, sand, asphalt or other form of man-made surface that lacks a sufficient food supply for herbivore fowl. The alternative area can also be a man-made structure, for example, decking, and may also take the form of a man-made island or floating raft. The only criteria for the alternative area is that the fowl are physically able and willing to enter the area and, in the case of herbivore waterfowl, that the area provides the herbivore waterfowl with easy access to water in order to provide the fowl with a needed sense of security from predators.

With particular respect to the use of the method of the present invention with Canada geese, a species of herbivore waterfowl, owing to the provision of an abundant and preferable food supply, and the provision of a means of egress to water as an escape from predators, it has been found that the birds in the alternative feeding area have a lower tendency to roam as compared to when they are forced to scavenge for food. As a result, less space is required for the alternative feeding area than is the case for traditional alternative feeding areas that rely on natural food sources. By requiring less space than the traditional grassy alternate areas required to relocate goose populations, it is possible to use the methods of the present invention in areas where large amounts of extra space are not available, for example, in waterfront areas and golf courses where unused land is not readily available. Thus, the methods of the present invention allow for the provision of an alternative feeding area that can be of a smaller size than the area in which the herbivore fowl population is not desired.

While it is necessary to have one alternative feeding area for the herbivore fowl to relocate, the methods of the present invention may also be used in areas in which there are more than one alternative feeding area, with each alternative feeding area having one or more attractant stations in order to provide the herbivore fowl with an attractive alternative to the deterrent driving them away from the area in which the congregation of fowl is not desired.

The Attractant

The attractant used in the present invention is in the form of feed, and in particular, feed that is more desirable to the herbivore fowl than the vegetation which forms the bulk of their diet. Thus, attractant feeds can take the form of corn, grains, seed, beans, fish pellets, ground insects, and mixtures thereof. By providing the attractant in the form of feed that is more attractive to the fowl than the vegetation that covers the areas in which the fowl cannot be tolerated, it is possible to induce the fowl to congregate and feed within areas where they would not normally congregate.

Preferred types of attractant feed can vary depending on the type of fowl being targeted. For example, Canada geese can be provided whole or cracked corn, which provides sufficient nutrition, is relatively inexpensive and is readily available. Alternatively, commercially available feeds for domestic geese and ducks, which include blended pellets of balanced nutritive feeds including grains and corn, can be used. Similarly, any other type of feed that is favoured by a particular species of fowl can be used.

Through the use of attractant stations to distribute the attractant, it is also possible to vary the type of feed that is provided. Thus, feeds can be distributed as mixtures, or as layers of individual feeds within attractant stations. Also, attractant stations within an area can be filled with different types of feeds as the attractant. The use of feed mixtures and/or different feeds in individual stations can increase the effectiveness of the present method when addressing more than one species of fowl.

The ability to vary the type of feed provided to the herbivore fowl provides a further benefit over the design of alternative sites to provide natural food sources to the fowl. Through the use of attractant stations, which can be refilled as needed, the food source in the alternative area is not susceptible to overfeeding by increased fowl populations or subject to environmental conditions, such as drought, that can devastate the natural food supply. If the alternative food supply is depleted or devastated, this will cause the fowl to move from the alternative area back to the area in which their presence cannot be tolerated in search of food regardless of the presence of a deterrent in the area.

The Repellent

The repellent used with the methods of the present invention is any repellent that can be dispersed onto the feed to form the adulterated feed that will be distributed on the area where the presence of the herbivore fowl is not desired. Preferably, the repellent is in solution form, which will allow it to be sprayed onto the feed, either before the feed is placed in the hopper of the repellent station or as the feed is distributed from the repellent station. Preferred repellents include commercially available repellents which are already approved for use as avian repellents, such as methyl anthranilate-based products (for example, REJEX-IT® from Natural Forces LLC, P.O. Box 2601, Davidson, N.C. 28036-2601, U.S.A. or AVIAN CONTROL™ or MIGRATE™ from Bird-B-Gone Inc., 23918 Skyline, Mission Viejo, Calif. 92692, U.S.A.) or anthraquinone-based products (for example, FLIGHT CONTROL® from Arkion Life Sciences, Airepel Division, 551 Mews Drive, Suite J, New Castle, Del. 19720, U.S.A.). However, any avian repellent that will adhere to the surface of the feed or be absorbed by the feed is suitable for use with the present methods. To minimize the loss of potency of the repellent over time while being stored in the repellent station, it is preferred that the repellent is sprayed on the feed as it is distributed from the repellent station.

The Attractant and Repellent Stations

Both the Attractant Station and the Repellent Station can, in a basic embodiment of the invention, involve the manual distribution of the attractant feed and the repellent-adulterated feed as required. However, it would be understood by the skilled reader that such an embodiment is not preferred owing to the need for an operator to continually monitor the site in order to ensure that feed is continually administered to both sites so that there is sufficient feed to both deter the presence of herbivore fowl in the area in which their presence cannot be tolerated and to maintain the attraction of the alternative area to the fowl. Ideally, the attractant and repellent stations will be automated as discussed below.

The Attractant Station

The attractant station of the present invention is comprised of one or more individual attractant stations located within the alternative area, that is, the area in which the presence of the herbivore fowl can be tolerated.

To induce the relocation of the herbivore fowl to the alternative area where their presence can be tolerated, the preferred attractant station is comprised of one or more feeders located in the alternative area where the fowl population can be tolerated. Ideally, the attractant station is comprised of an automated feeder that will dispense feed, and wherein the amount of feed dispensed throughout a day can be varied as needed in order to maintain the presence of the fowl in the area. However, non-automated feeders may also be used.

The number of attractant stations and their location in a given alternative area will depend on the size of the alternative area and the number and species of fowl being attracted to the alternative area. As an example, in one of the embodiments of the invention described below, a flock of approximately one hundred Canada geese was adequately fed using two 300 pound attractant stations, with the feed lasting for three weeks before replenishment was required.

In a preferred embodiment, the attractant station is comprised of one or more automated feed stations. In general, an automated feed station will be comprised of a hopper to store the feed to be used as an attractant, a discharge mechanism to distribute the feed, a timer to control the distribution of the feed, and a power source, for example, a battery and solar battery charger. Examples of commercially available feeders meeting these criteria include the automatic deer feeders marketed by Boss Buck Inc. (210 S. Highway 175, Seagoville, Tex. 75159, U.S.A.), which, depending on the model selected can provide 350 lbs or more of feed, and automated feeders available from On Time Feeders Inc. (2488 HWY 33, Ruston, La. 71270, U.S.A.). However, suitable feeders can also be manufactured to meet specific needs.

Ideally, the stations will be programmed to provide feed as the attractant during times in which the herbivore fowl normally feed. For example, with increased amounts of feed being distributed from the station in the early morning around sun-up and again in the late afternoon through dusk, and optionally, with smaller amounts of attractant feed being distributed during the remainder of the day. However, it will be understood that the programming of the station will be adjusted based on the feeding habits of the fowl at a given location.

The Repellent Station

Like the attractant station, the repellent station of the present invention is comprised of one or more individual repellent stations. The one or more repellent stations are located in the area in which the presence of the herbivore fowl is not desired so that the adulterated feed that is dispensed from the one or more repellent stations discourages the fowl from foraging for food in the area.

The main criteria for the selection of the feed to be used in the repellent stations is that the herbivore fowl find this feed more desirable than the available grass or other naturally occurring food sources in the area, and that the feed is capable of absorbing the repellent solution that is used to adulterate the feed so that the repellent will be delivered when the feed is eaten by the waterfowl. Alternatively, the repellent can adhere to the surface of the feed.

In one preferred embodiment, the repellent station of the present invention makes use of the same type of feeder that is used in the attractant station. In this embodiment, the feed to be distributed by the repellent station is pre-treated with the repellent to form the adulterated feed. This pre-treatment can be done by soaking the feed in a repellent solution, thoroughly spraying the feed with a repellent solution or any other means that allows the feed to be coated or impregnated with the repellent solution to form the adulterated feed. The adulterated feed is then distributed from the feeder in the same manner as the attractant feed.

In a second preferred embodiment, the repellent station of the present invention makes use of a modified automatic feeder that, in addition to possessing the features of the feeders used for the attractant station, is also equipped with a repellent reservoir. As the non-adulterated feed is distributed from the hopper, repellent solution from the repellent reservoir is sprayed onto the feed to form the adulterated feed. By using the modified feeder containing a repellent reservoir, it is not necessary to pre-treat the non-adulterated feed, and the non-adulterated feed can be freshly treated with the repellent as it is distributed. A further benefit of using a modified feeder is that the level of repellent dispersed on the feed can be modified as needed to increase or decrease the amount of repellent that is on the feed as conditions may require.

Like the automatic feeders used for the attractant station, the repellent stations can also make use of the same commercially available feeders, which are then modified to add the repellent reservoir. In general, the feeders are modified to add a repellent reservoir, either within the hopper or attached to the outside of the hopper. Thus, in addition to being comprised of a hopper, a discharge mechanism to distribute the feed, a timer, and a power source, the repellent station will be modified with a repellent reservoir. The outlet of the repellent reservoir is directed so that the repellent solution can be sprayed onto the feed as it is distributed from the feeder, with the distribution of the repellent solution controlled by a timer in the same manner as is the distribution of the feed. For example, the repellent solution can be discharged from one or more nozzles onto the rotational distribution plate of the automatic feeder as the feed is dispensed, or the repellent solution can be dispensed onto the flow of feed from the hopper to the distribution plate.

By including control means into the valves controlling the release of the repellent solution from the repellent reservoir, the flow rate of the repellent solution that is discharged from the reservoir can be adjusted. The ability to adjust the flow rate allows the distribution of the repellent solution to be optimized for the type of feed and concentration of repellent solution.

By spraying the feed with the repellent solution as it is distributed from the hopper, the feed becomes adulterated with the repellent, which then sits below the feeder. Since the adulterated feed acts as a deterrent for the herbivore fowl in the area where the fowl population is not desired, less food will be consumed at the repellent stations than at the attractant stations. As a result, the capacity of the hopper in the repellent station can be smaller than the hopper for the attractant stations. Also, since less feed will be consumed, the repellent station can distribute feed for shorter periods of time, less frequently, and/or in lesser amounts.

Repellent stations can be placed throughout the area or areas in which the presence of the herbivore fowl is not desired, however, best results with the present method have been observed where the repellent station is located near where the fowl enter the area in which their presence is not desired. In the case of waterfowl, this is generally a point at which the fowl will come ashore from the open water. By placing the repellent station at a point of entry, the fowl immediately encounter the undesirable repellent-adulterated feed, and will begin to search for a new food source.

In a further alternative, the repellent station is comprised of one or more commercially available feeders, each of which is installed in conjunction with a repellent dispenser comprising a repellent reservoir and a means of distributing a repellent solution in the same manner as in the repellent station described above, wherein the repellent dispenser is positioned in such a way that the repellent solution is dispensed onto the non-adulterated feed as it is distributed from a feeder.

Further embodiments of the invention relating to the repellent station allow for the inclusion of means to remotely monitor and control the operation of the repellent station. For example, through the use of sensors and a means of communication, the levels of feed and repellent solution can be remotely monitored, the frequency of distribution of adulterated feed can be controlled, the rate and amount of adulterated feed dispensed can be controlled, and the amount of repellent solution dispensed to adulterate the non-adulterated feed may be controlled. Although a wired means of communication can be used, preferably, each repellent station is able to communicate with a control centre wirelessly, for example, through a Wi-Fi or wireless network.

In the same manner, similar means can be included within the attractant station used in the described method to remotely monitor and control the distribution of the attractant feed.

The repellent and attractant stations can be powered in a variety of ways, such as solar power, battery power, or through connection to an electrical grid. Sources such as solar and/or battery power are preferred since this allows the stations to be easily relocated as need arises.

The use of remote monitoring is of particular advantage for sites where multiple repellent and attractant stations have been deployed since repellent and attractant stations can be monitored without requiring actual visits to the stations until replenishment of the feed and/or repellent solution is required. Additionally, remote monitoring can be enhanced through the use of video surveillance using cameras that are integrated into the repellent or attractant stations, or are placed in areas in which they can view one or more stations. Through the use of video surveillance, the herbivore fowl population and their behaviour in both the areas where the fowl are not desired and the areas in which the presence of fowl can be tolerated, can be monitored. Such monitoring allows, for example, adjustments to be made to the amount or duration of attractant feed to be distributed, the amount or duration of repellent feed to be distributed, or the amount of repellent that is used to adulterate the repellent feed. These adjustments can be made directly in cases where the repellent and attractant stations can be remotely controlled, or scheduled in cases where the repellent and attractant stations require manual control.

When battery and/or solar power is used to power the repellent or attractant stations, and optionally, any desired remote monitoring is transmitted wirelessly, the stations can be relocated as needed in order to better control the areas in which the fowl congregate.

Preferred methods, attractant stations and repellent stations for the implementation of the present invention are illustrated in the following non-limiting examples describing various aspects of the embodiments described herein. It will be apparent to the skilled reader that various alterations may be made when using the methods of the present invention without departing from the scope or intent thereof. Similarly, it will be apparent to the skilled reader that various alterations to the attractant and repellent stations may be made when using the methods or apparatus of the present invention without departing from the scope or intent thereof.

EXAMPLES

Example 1—Comparative Example

A problem was experienced with a nuisance population of approximately one hundred Canada Geese in a multi-use park area. The area was approximately 20,000 square feet, with shortly cropped grass, shady areas, and both a gently sloping lawn descending to the water as well as boat ramps extending into the water. In total, approximately 125 lineal feet of the area provided favourable access for geese to move between the water and the grassy area, with the remainder of the grassy area bordered by water being raised sea walls that were not attractive entry points but still suitable as an escape route for the geese. As in many instances with nuisance waterfowl populations, modifying the landscape to discourage geese was deemed to be impractical and undesirable to the humans who also wish to use the same space. For example, it was deemed impractical to allow the grass to grow to longer lengths in the widely used park area and also deemed impractical to eliminate or minimize access to the water.

In an attempt to deter the geese from congregating in the area, wide-scale spraying using a methyl anthranilate-based goose repellent (AVIGON® 14.5, Engage Agro Corporation, Guelph, ON) according to the manufacturer's guidelines was performed. Initially, this spraying was successful in deterring the geese, who moved to adjacent areas that had not been sprayed. However, within three weeks the effect of the repellent had been reduced by rainfall, the treated grassy area growing naturally and then being mowed, and irrigation, and the geese gradually returned. Continued application of the repellent was deemed to be unfeasible from both a practical and economic standpoint owing to the long-term cost of the repellent and manpower for application, complaints from park users viewing the widespread spraying of the lawns, as well as the associated odour of the repellent and the need for continued irrigation to maintain an attractive lawn appearance, which in turn continues the need for future applications.

A second attempt to control the goose population in this way was to adulterate feed, in this case cracked corn, with the repellent in an attempt to reduce the cost of the repellent associated with wide-scale repellent spraying. The feed was adulterated with the repellent by mixing ⅓ of a bushel of cracked corn with 250 mL of the undiluted AVIGON® 14.5 solution. The adulterated feed was then distributed using a commercially available feeder (a 200 lb. capacity tripod mounted hopper and SOLAR ELITE® dispensing head obtained from On Time Wildlife Feeders (2488 Hwy 33, Ruston, La. 71270, U.S.A.)). However, this approach was not successful. Owing to drought conditions that reduced the availability of grass upon which the geese could feed, the geese fed on both the remaining grass and the adulterated feed (despite the presence of the repellent). This failure illustrates that the presence of a repellent, on its own, is unable to deter geese when there is not a viable food alternative available in sufficient amounts, and highlights the problems associated with relying upon naturally occurring food sources, which are subject to environmental changes.

Example 2—Use of Adulterated, Repellent-Treated, Feed and Non-Adulterated Feed to Control Goose Populations in a Recreational Area Owing to the problems encountered with both wide-scale repellent spraying and the use of repellent-treated feed on its own, a new approach to controlling the goose population at the site of Example 1 was developed. In this new approach, both repellent-adulterated feed in the form of cracked corn treated with methyl anthranilate, and non-adulterated feed (also in the form of cracked corn) was used. By using non-adulterated feed as an attractant, it was found that the geese were quickly and effectively lured away from the desirable grassy area by providing a more desirable food as an alternative to the grass upon which the geese had been feeding. It was also found that the use of a more attractive food source allowed the geese to be moved to non-traditional feeding sites that did not have short-cut grass.

In this approach to controlling the goose population at the site of Example 1, a commercially available animal feeder with a 200 lb. capacity tripod mounted hopper and SOLAR ELITE® dispensing head were obtained from On Time Wildlife Feeders (2488 Hwy 33, Ruston, La. 71270, U.S.A.). The feeder was modified as described in Example 5 to become a repellent station. The repellent reservoir was filled with an 8% solution of methyl anthranilate solution (prepared using fifty-five percent of a commercially available REJEX-IT® solution and forty-five percent water) and the flow rate from the repellent reservoir was adjusted to be approximately 0.0025 liters per second. The hopper of the repellent station was then filled with cracked corn.

In FIG. 1a a portion of the site described in Example 1 is depicted. In this portion of the site, access to the grassy area 100, in which shade is provided by trees 102, is provided through both the adjacent (not pictured) grassy area with the direct water 104 access and through boat ramp 106 onto paved area 108. In this area, access to water 104 for geese and other waterfowl is limited by raised seawall 110 and travel along the seawall to direct access to the grassy area is hindered by dock 112.

Repellent station 114 was installed on the edge of grassy area 100 near boat ramp 106 where geese had been exiting water 104 to gain access to grassy area 100. The timer on the repellent station was set to distribute feed at 5:30 am for eight seconds at 100% motor speed, and again at 4:30 pm for eight seconds at 100% motor speed. Adjacent to the repellent feeder 114 in grassy area 100 was a paved area 108 used to store boat trailers and which, during feeding times in the early morning hours and later in the day was not used for boat launching. One end of paved area 108 provided access to water 104 via boat ramp 106. Within paved area 108, a quarter bushel of cracked corn was manually distributed in area 116 twice daily (prior to dawn and again around five o'clock).

Following the installation of repellent station 114 and the distribution of the cracked corn as an attractant in area 116, the geese who had been feeding on grassy area 100 were first drawn to the repellent-adulterated cracked corn in the area around the base of repellent station 114. However, upon realizing that the cracked corn was intolerable owing to the treatment with the methyl anthranilate repellent, they then moved to the unadulterated feed (cracked corn) that had been distributed in the paved area 108 in area 116. Surprisingly, the geese continued to feed on the cracked corn in area 116 and did not return to grassy area 100 despite the fact that a paved area is not a terrain that geese normally favour. This new feeding behaviour continued for the length of the trial.

As a result of the installation of repellent station 114 and distribution of attractant feed in area 116, it was possible to induce the nuisance population of Canada geese to leave grassy area 100, of approximately twenty thousand square feet (only a portion of which is shown in FIG. 1a) and to feed and congregate in a small paved area (108) of approximately one thousand square feet, with attractant feed being distributed across only a small portion of this area. In this example, it was necessary to sacrifice the use of only an area of approximately twenty-five square feet at the edge of grassy area 100 where the adulterated feed from repellent station 114 was distributed. This test was successful, with no return of the geese to grassy area 100 over the six-week period of the test. However, when the test was discontinued following the end of the six-week period, Canada geese returned to the area where their presence could not be tolerated almost immediately since they were no longer being deterred from doing so. It will be appreciated by the skilled reader that an attractant station could also be installed in paved area 108 to distribute feed with the same effect.

Figure 1B:
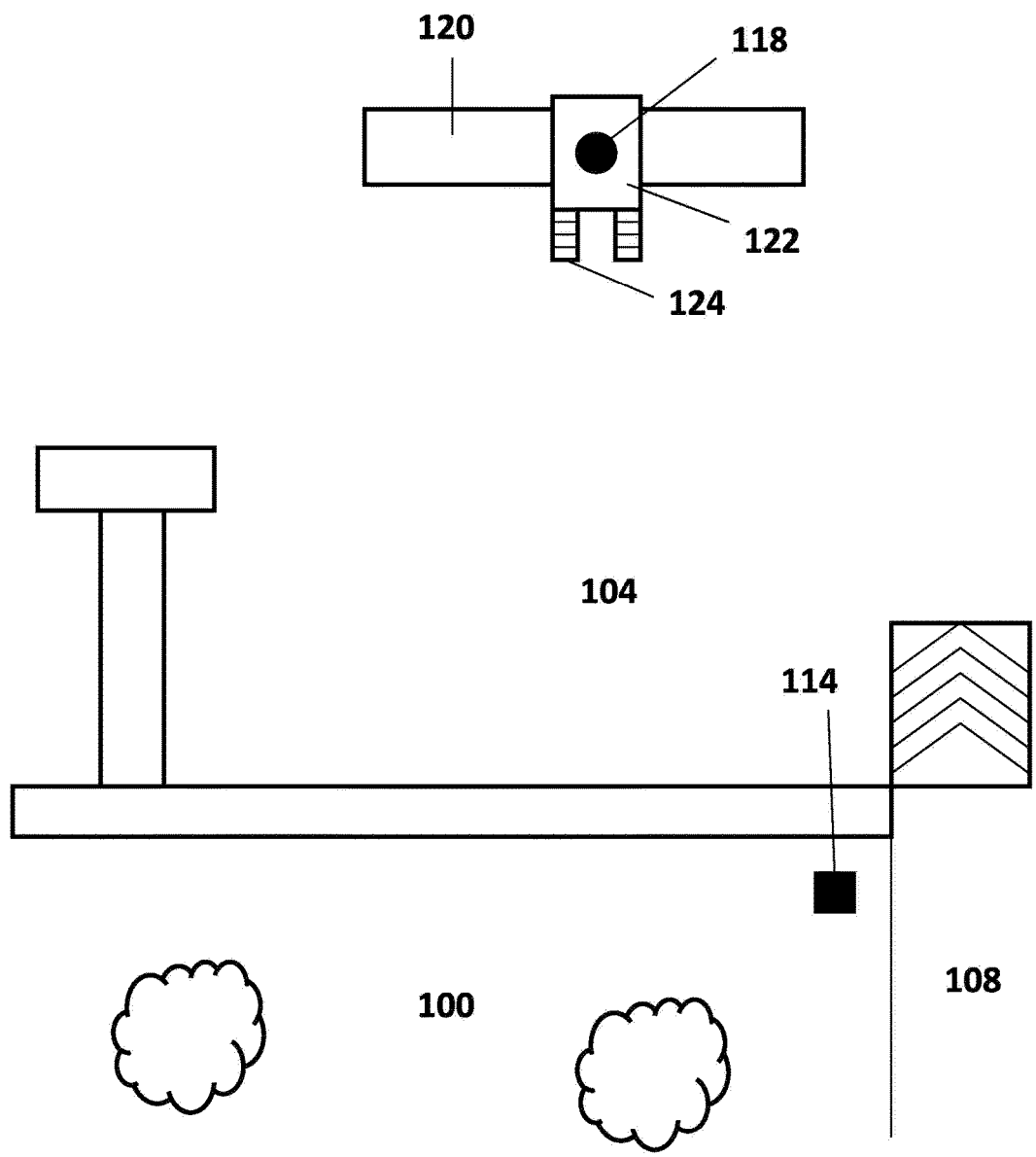

In a second test at this site depicted in FIG. 1b, attractant station 118 (a commercially available animal feeder with a 300 lb. capacity tripod mounted hopper from Boss Buck Inc. (210 S. Highway 175, Seagoville, Tex. 75159, U.S.A.)) was installed on wave attenuator 120 located approximately two hundred yards offshore grassy area 100 in water 104. For this installation, a sixty-four square foot platform 122 was laid across wave attenuator 120 and attractant station 118 was placed in the center of platform 122. Two ramps 124 were attached to platform 122 and extended to the water (104) to allow geese access to platform 122 and the distributed attractant feed. Attractant station 118 was set to distribute feed for eight seconds at low speed at 5:30 am, 6:30 am, and 7:30 am. 4:30 pm, 5:30 pm and at 6:30 pm. Despite the greater distance from both grassy area 100 and repellent station 114, this alternative area for housing an attractant station 118 was also effective keeping the geese population from feeding and congregating in grassy area 100 where their presence had been deemed to be a nuisance. Further, the use of a hopper that automatically distributed the feed avoided the need to manually distribute the feed twice daily.

Figure 2:
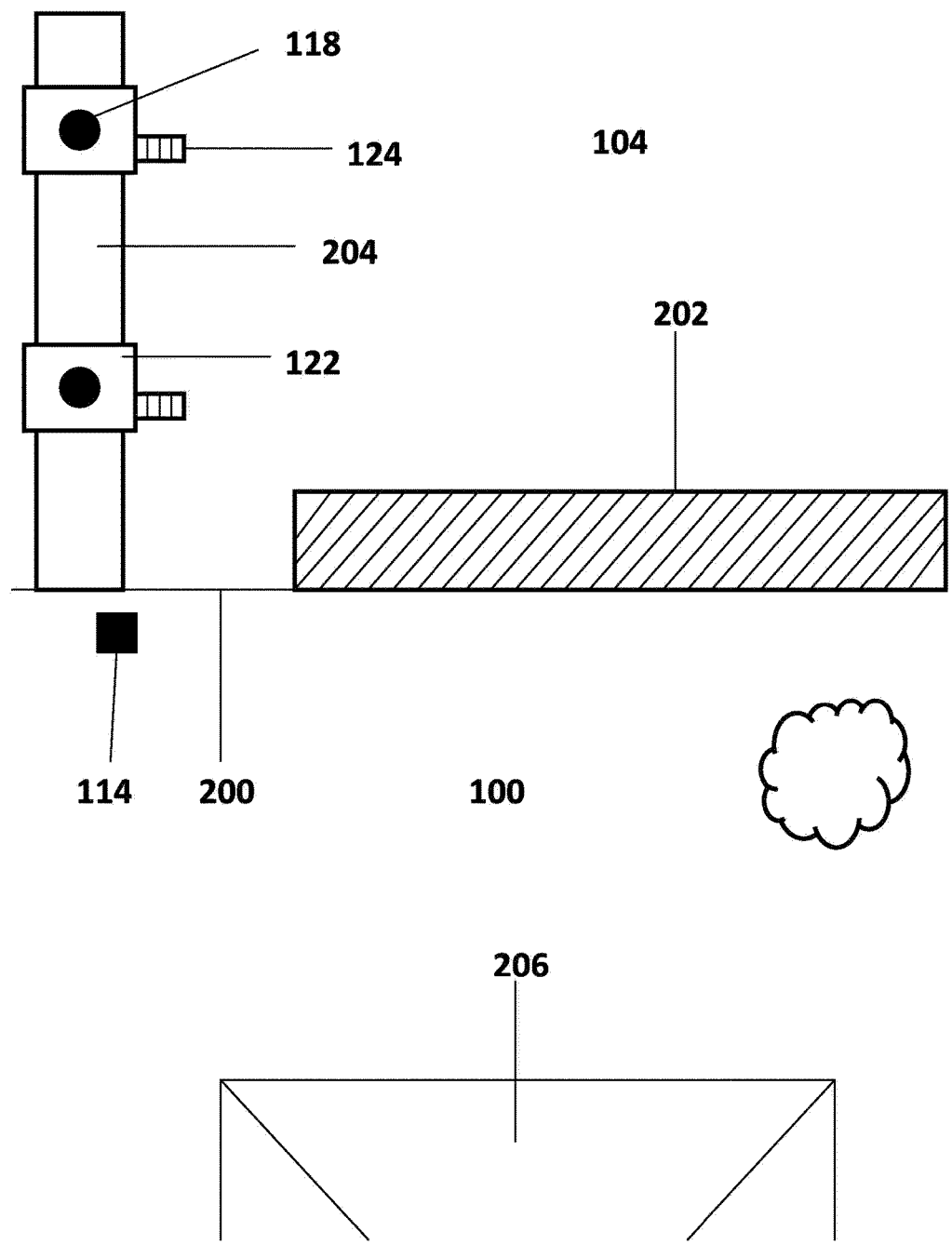
FIG. 2 provides a depiction of a further embodiment of the present invention at a cottage as explained in Example 3.

Example 3—Use of Adulterated, Repellent-Treated, Feed and Non-Adulterated Feed to Control Goose Populations at a Cottage Using feeders of the same design as described in Example 2, a population of approximately one hundred Canada geese that had for a number of years been considered a nuisance population at a residential cottage fronting onto a lake was targeted. The site was made particularly attractive to the geese owing to the presence of a large lawn between the cottage and water. In this application of the present invention, as depicted in FIG. 2, repellent station 114 was installed adjacent to access 200 to grassy area 100 where the geese entered the property when emerging from water 104. Access to grassy area 100 from water 104 was restricted by dock area 202. Owing to the lack of a suitably sized area that could serve as an alternative feeding site on land, attractant stations 118 were installed on a man-made rock breakwater 204 that extended from the shore into water 104 on one side of grassy area 100. To make the terrain accessible to the geese, the attractant stations 118 were installed in the center of two sixty-four square foot platforms 122 that provided both a site to house the attractant stations 118 and space in which the attractant feed could be distributed. Ramps 124 extended from platforms 122 into water 104 to provide access to the attractant feed for the geese.

Immediately upon installing repellent station 114 and attractant stations 118, the nuisance geese left the grassy area 100 around cottage 206 and began feeding on platforms 122 placed on the rock breakwater 204. By leaving the stations 114 and 118 operational, the Canada geese were deterred from congregating in grassy area 100 around cottage 206 for the entire season.

Figure 3:
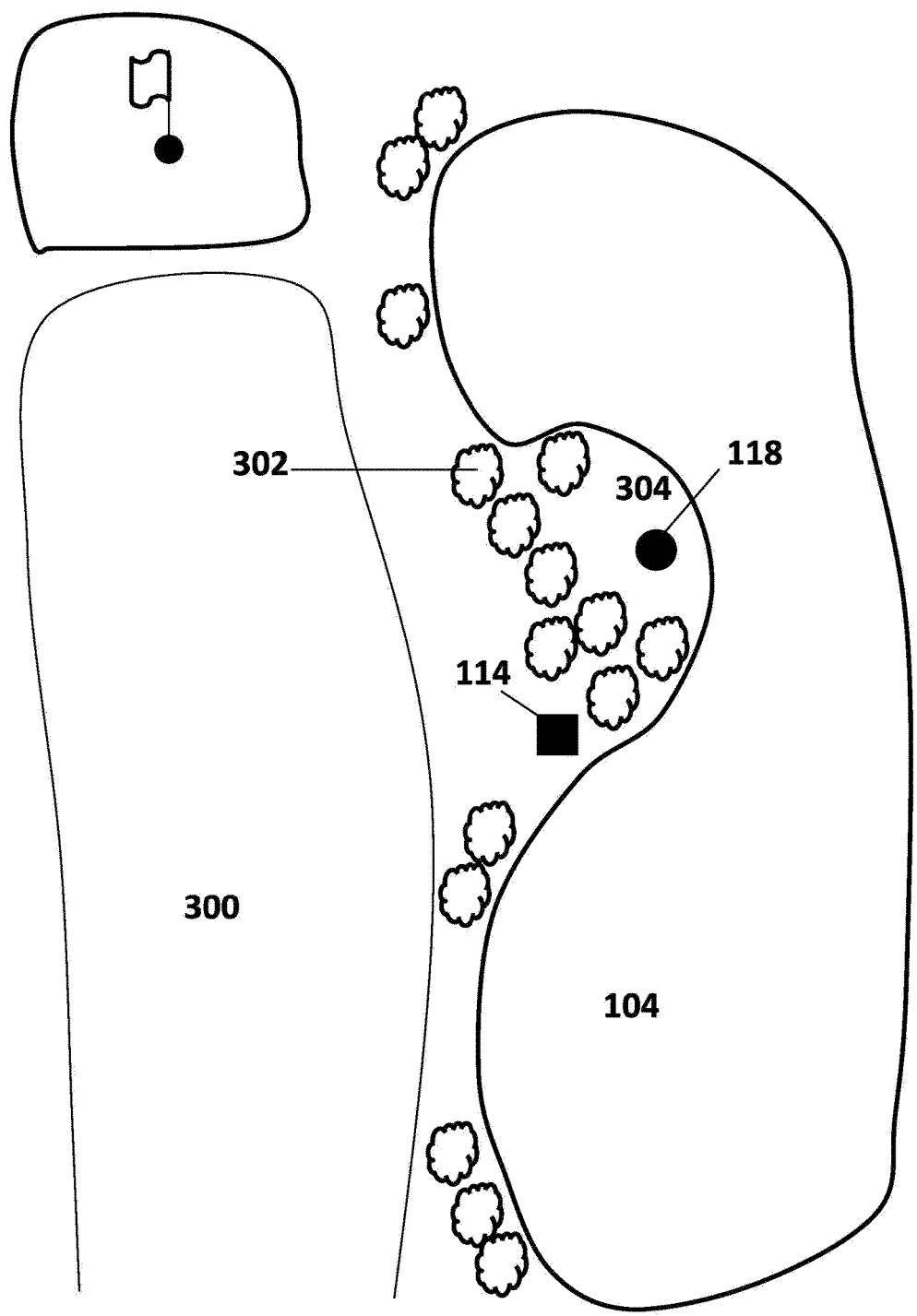
FIG. 3 provides a depiction of another embodiment of the present invention at a golf course as explained in Example 4.

Example 4—Use of Adulterated, Repellent-Treated, Feed and Non-Adulterated Feed to Control Goose Populations at a Golf Course Using feeders of the same design as described in Example 2, a nuisance population of Canada geese that was congregating on the fairway of a gold course was targeted. With reference to FIG. 3, in this instance, fairway 300, with its well maintained grass, provided an attractive grazing area for the geese. Along one side of fairway 300 was water 104 in the form of a pond (approximately 400'×150'), that was bordered in part by high vegetation 302. A repellent station 114 was installed at the edge of fairway 300 adjacent to water 104 where the geese could access fairway 300. Since there was no readily available grassy area that could be used as an alternative feeding area, a small area 304 within the vegetation 302 adjacent to water 104 was trimmed down to the point where geese could traverse the area. Attractant station 118 was then installed in isolated area 304 that was bordered on three sides by vegetation 302 and one side by water 104. Within days of the installation of repellent station 114 and attractant station 118, the geese began congregating in an area with an approximate 15' radius around the attractant station 118 in the alternative feeding area 304, and no longer congregated on fairway 300 of the golf course.

Example 5—Repellent Station

Figure 4:
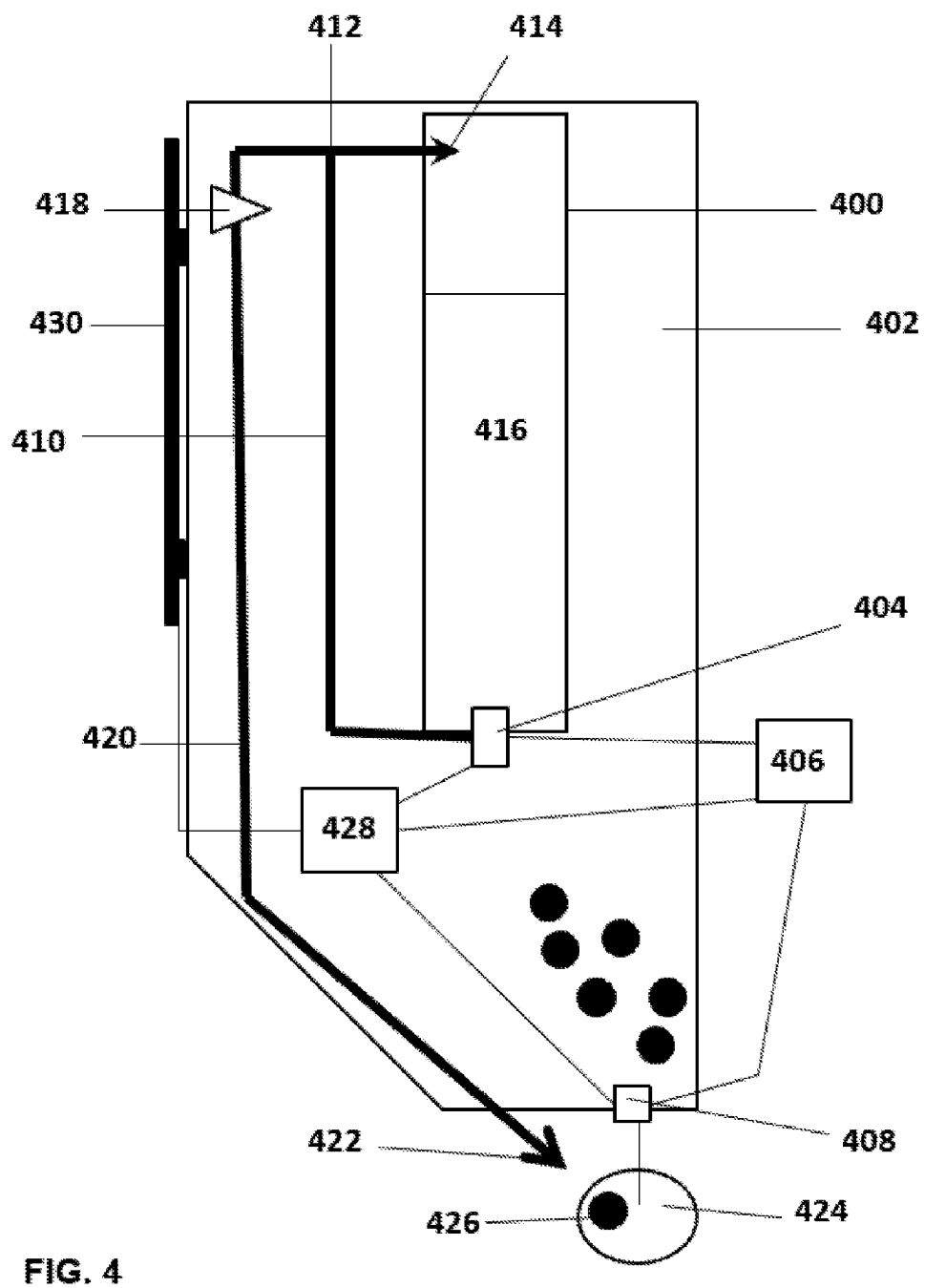
FIG. 4 provides a sectional view of a preferred embodiment of a repellent station of the present invention as described in Example 5.

An On Time Wildlife Feeder (2488 Hwy 33, Ruston, La. 71270, U.S.A.) with a 200 lb. capacity tripod mounted hopper and SOLAR ELITE® dispensing head was converted into a repellent station as depicted in FIG. 4. A 22"×4" tubular reservoir 400 was installed against an interior wall of hopper 402. Attached to the bottom of reservoir 400 was an automotive-style windshield washer pump 404 that is controlled by the timer 406 used for the feed dispenser 408. Tubing 410 is used to connect the outlet of the pump 404 upwards to the top of the reservoir to "T" fitting 412. One side of "T" fitting 412 feeds a dispensing nozzle 414 that feeds back into reservoir 400 contain repellent solution 416. The other side of "T" fitting 412 leads to an apportioning valve 418 that can be used to regulate the repellent 416 flow. Tubing 420 leads from the apportioning valve 418 to a second nozzle 422 external to the cone at the bottom of the hopper 402, and was aimed at distribution plate 424 under hopper 402. Pump 404, timer 406, and feed dispenser 408 are powered by power source 428, which is a battery that can be recharged by solar cell 430 on the exterior of the hopper 402.

By adjusting apportioning valve 418, the amount of repellent solution 416 that passes through the valve, and ultimately to dispensing nozzle 422, can be regulated, with the remainder of the repellent 416 being returned to repellent reservoir 400. The installation of the second nozzle is also used to allow air to enter the discharge line and prevent siphoning of the contents of the repellent reservoir once the repellent flow has been established by the pump but after the pump is no longer energized with power. This prevents the entire contents of reservoir 400 from emptying by siphon. As feed 426 is distributed from hopper 402 onto distribution plate 424, it is sprayed with repellent solution 416 from nozzle 422. However, it would be understood that depending on the type of pump and valves used, many alternative methods of providing for and regulating the repellent solution flow can be substituted in the repellent station.

As would be understood by the skilled reader, the shape, capacity and mounting location of the reservoir is variable, the only requirement being that the discharge of the reservoir can be directed at the feed being distributed from the hopper, and for practical reasons, that a port in the reservoir is accessible to refill the reservoir with repellent solution as needed. Similarly, the type of pump used and its location of installation are variable. As an alternative, a solenoid valve could also be used to control the flow of repellent solution in place of a pump. In this alternative, the repellent would flow under the effect of gravity.

Figure 5:
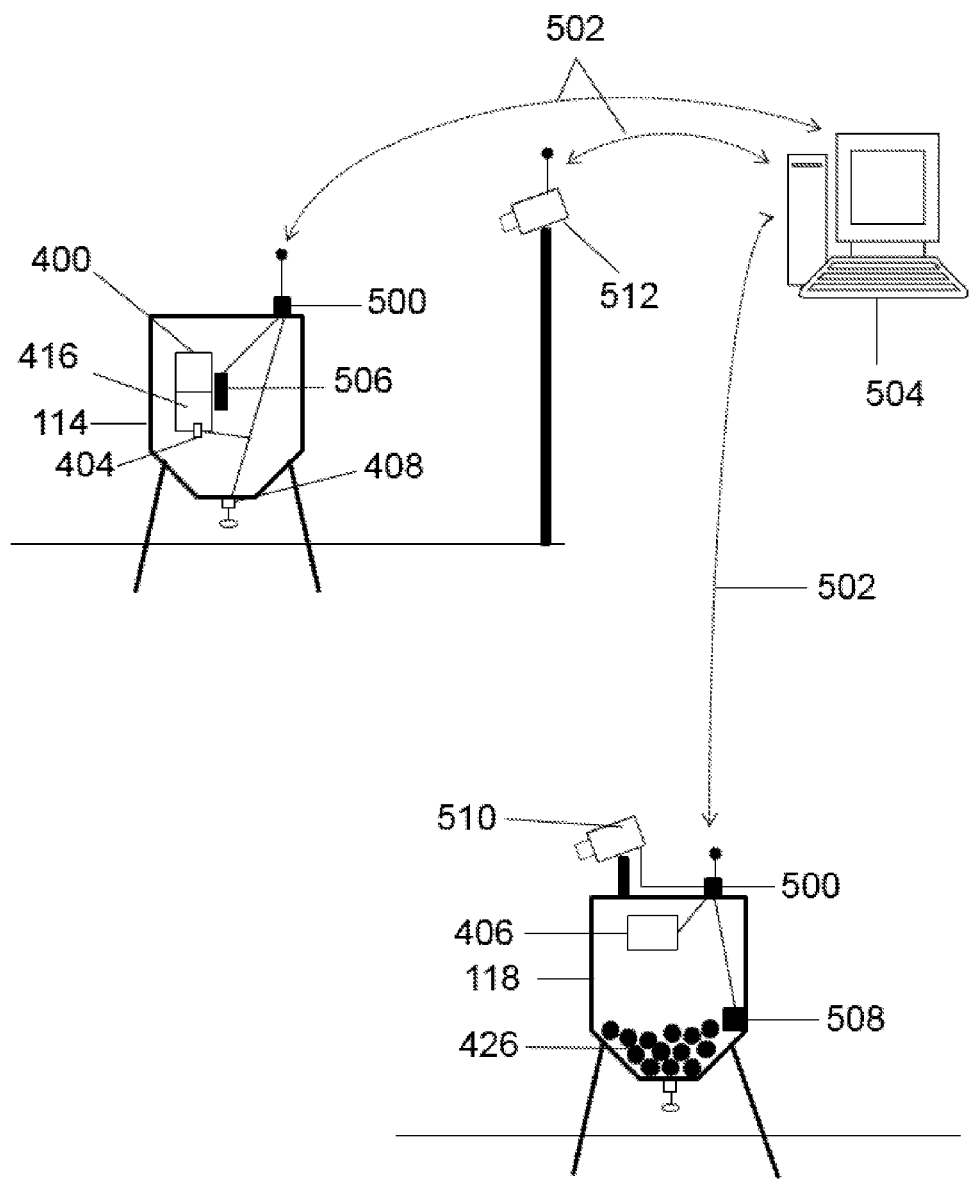
FIG. 5 provides a depiction of another embodiment of the present invention wherein the repellent and attractant stations (shown in section view) of the invention are controlled remotely.

In addition to the basic repellent station containing a repellent reservoir that has been described in this example, further modifications can be made to add electronics to remotely monitor the levels of feed and repellent solution, as well as to control the timing of feed distribution and the rate of repellent solution discharge. For example, as depicted in FIG. 5, repellent station 114 is equipped with controller 500 that can communicate wirelessly 502 with control centre 504 to allow for the remote monitoring and operation of the repellent station 114. In the same manner, control centre 504 can also communicate remotely with an attractant station 118 equipped with a controller 500 to monitor and control the distribution of the attractant feed in the area in which the presence of the herbivore waterfowl can be tolerated. This, allows, for example, a sensor 506 to monitor the level of repellent solution 416 remaining in repellent reservoir 400 within repellent station 114, a sensor 508 to monitor the level of feed 426 present in the attractant station 118, the control of pump 404 and/or feed dispenser 408, or for the programming of timer 406. Further if desired a camera either integrated into a station 510 or placed in the surrounding area 512, may be used to monitor the area around a repellent station 114 or attractant station 118.

The invention claimed is:

1. A method for controlling the location in which herbivore fowl populations congregate while on land, the method comprising:
   (a) providing a deterrent in the form of adulterated feed distributed in one or more portions of the area in which the presence of herbivore fowl is not desired, wherein the adulterated feed comprises corn, grains, seed, beans, fish pellets, ground insects or mixtures thereof, treated with a repellent, and wherein the remainder of the area in which the presence of herbivore fowl is not desired is not provided with the deterrent; and
   (b) providing an attractant in the form of non-adulterated feed in an alternative area where the presence of herbivore fowl can be tolerated that is proximate to the area in which the presence of herbivore fowl is not desired;
   wherein the deterrent is distributed in the area in which the herbivore fowl population is not desired by one or more repellent stations, wherein each of the one or more repellent stations comprises:
   (i) a hopper capable of storing feed, wherein the feed is not adulterated;
   (ii) a means for distributing the feed from the hopper;
   (iii) a means for controlling the distribution of the feed at scheduled intervals;
   (iv) a repellent reservoir capable of storing a repellent solution; and
   (v) a means for controlling the release of the repellent solution such that the repellent solution is released concurrently with the distribution of the feed, or immediately thereafter, in such a manner that the repellent solution adulterates the feed to form the adulterated feed.

2. The method of claim 1, wherein the repellent solution is a methyl anthranilate-based repellent.

3. The method of claim 1, wherein the alternative area in which the herbivore fowl population can be tolerated is, absent the provision of the non-adulterated feed, not an area in which the fowl can obtain an adequate supply of food.

4. The method of claim 3, wherein the alternative area in which the herbivore fowl population can be tolerated is a man-made structure, or an area primarily covered in dirt, rock, stone, sand, asphalt or other form of man-made surface, or a combination thereof.

5. The method of claim 1, wherein the attractant is distributed in the alternative area in which the herbivore fowl population can be tolerated by one or more attractant stations, wherein each of the one or more attractant stations comprises:
   (a) a hopper capable of storing non-adulterated feed;
   (b) a means for distributing the feed from the hopper; and
   (c) a means for controlling the distribution of the non-adulterated feed at scheduled intervals.

6. The method of claim 5, wherein the non-adulterated feed is selected from the group consisting of corn, grains, seed, beans, fish pellets, ground insects and mixtures thereof.

7. The method of claim 6, wherein the non-adulterated feed is corn.

8. The method of claim 5, wherein the means for distributing the feed from the hopper of the one or more attractant stations is a rotating distribution plate.

9. The method of claim 1, wherein the herbivore fowl is a species of herbivore waterfowl.

10. The method of claim 9, wherein the alternative area in which the waterfowl population can be tolerated provides a means of egress for the waterfowl to open water.

11. The method of claim 1, wherein the means for distributing the feed from the hopper of the one or more repellent stations is a rotating distribution plate.

* * * * *